US012811018B2

(12) United States Patent
Volpe

(10) Patent No.: US 12,811,018 B2
(45) Date of Patent: Nov. 24, 2026

(54) MODULAR MAGNETIC CONFINEMENT DEVICE

(71) Applicant: Renaissance Fusion, Fontaine (FR)

(72) Inventor: Francesco Volpe, Fontaine (FR)

(73) Assignee: RENAISSANCE FUSION, Fontaine (FR)

( * ) Notice: Subject to any disclaimer, the term of this patent is extended or adjusted under 35 U.S.C. 154(b) by 259 days.

(21) Appl. No.: 18/850,433

(22) PCT Filed: Mar. 31, 2023

(86) PCT No.: PCT/EP2023/058474
§ 371 (c)(1),
(2) Date: Sep. 24, 2024

(87) PCT Pub. No.: WO2023/194227
PCT Pub. Date: Oct. 12, 2023

(65) Prior Publication Data

US 2025/0218604 A1 Jul. 3, 2025

(30) Foreign Application Priority Data

Apr. 4, 2022 (EP) .................................... 22305437
Apr. 4, 2022 (EP) .................................... 22305446

(51) Int. Cl.

| | |
|---|---|
| ***G21B 1/05*** | (2006.01) |
| ***G21B 1/13*** | (2006.01) |
| ***H01F 5/04*** | (2006.01) |
| ***H01F 6/04*** | (2006.01) |
| ***H01F 6/06*** | (2006.01) |

(52) U.S. Cl.
CPC ................ *G21B 1/05* (2013.01); *H01F 5/04* (2013.01); *H01F 6/04* (2013.01); *H01F 6/06* (2013.01); *G21B 1/13* (2013.01)

(58) Field of Classification Search
CPC .... G21B 1/05; G21B 1/13; H01F 5/04; H01F 6/04; H01F 6/06; Y02E 30/10
See application file for complete search history.

(56) References Cited

U.S. PATENT DOCUMENTS 4,268,353 A * 5/1981 Powell ..................... H05H 1/12
976/DIG. 1

FOREIGN PATENT DOCUMENTS

| | | | |
|---|---|---|---|
| GB | 2562385 | A | 11/2018 |
| WO | 2020201540 | A2 | 10/2020 |
| WO | 2021195383 | A1 | 9/2021 |

OTHER PUBLICATIONS

Zuo et al., CN 102653856, Sep. 5, 2012 (Year: 2012).*
Labombard, WO 2021236185, Nov. 25, 2021 (Year: 2021).*
(Continued)

*Primary Examiner* — Mary Ellen Bowman
(74) *Attorney, Agent, or Firm* — Perilla Knox & Hildebrandt LLP; Jason M. Perilla

(57) ABSTRACT

The present disclosure relates to a magnetic confinement device comprising a plurality of modules coupled to each other, wherein each module (100) is adapted to conduct current in order to form a magnetic field and has:—a first wall (110) having a connecting surface (102) adapted to engage a connecting surface of another module of the plurality of modules; and—a groove (202) separating the first wall (110) into at least two different electrically conducting regions.

19 Claims, 3 Drawing Sheets

(56) References Cited

OTHER PUBLICATIONS

Slade et al., WO 2023083667, May 19, 2023 (Year: 2023).*
Kochat et al., WO 2023194229, Oct. 12, 2023 (Year: 2023).*
International Search Report and Written Opinion for PCT/EP2023/058474 mailed Jul. 11, 2023.

* cited by examiner

MODULAR MAGNETIC CONFINEMENT DEVICE

This application is a 35 U.S.C. § 371 national stage patent application of Patent Cooperation Treaty application number PCT/EP2023/058474, filed Mar. 31, 2023, and entitled "MODULAR MAGNETIC CONFINEMENT DEVICE," which claims the benefit of and priority to European patent application number 22305446, filed on Apr. 4, 2022, entitled "MODULAR MAGNETIC CONFINEMENT DEVICE," and of European patent application number 22305437, filed on Apr. 4, 2022, entitled "METHOD FOR MANUFACTURING SUPERCONDUCTING COILS AND DEVICE," the entire disclosures of both of which are hereby incorporated herein by reference.

TECHNICAL FIELD

Disclosed herein is a modular device for confinement of magnetic fields. Specifically, the modular magnetic confinement device described is related to containment of plasma and its applications including generation of energy in fusion reactors.

BACKGROUND ART

The modern world is in dire need of new energy sources. Energy sources that are not only clean but easily renewable and highly available. Fusion energy obtained from fusion reactions in a fusion reactor is an energy source with all of these characteristics.

Presently, the prospect of reliable and widely available fusion energy is yet to be fulfilled. Among the biggest obstacles to achieving fusion energy is the construction of a fusion reactor. Construction of a fusion reactor requires careful selection of materials, complex geometries for magnetic confinement and careful considerations regarding the extraction of produced energy.

Many different geometries for magnetic confinement can be identified in the art including Tokamaks, Spherical Tokamaks, Spheromaks and Stellarators, each having their own benefits and difficulties. From an engineering perspective, all of these geometries share the same complication, that they all have to be achieved by a volumetric construction. It is not known in the art any possible way to achieve feasible geometries without constructing magnets in three dimensions.

A fusion reactor is described in U.S. Pat. No. 9,959,942 to McGuire. The device described by McGuire is compact, able to fit inside airplanes and even large cars, yet the device as described exemplifies two big engineering challenges that still require a solution. First, although the device is small it requires a large amount of parts, a realization of any of the embodiments described would require many more parts than those of a car or even an airplane. Second, a large number of different coils and coil arrangements are required to achieve magnetic encapsulation, which is just another term for magnetic confinement.

With respect to the coils, the prior art teaches several methods for constructing one, for instance the superconducting coil described in U.S. Pat. No. 8,655,423 to Miyazaki, et al. Miyazaki describes a superconducting coil formed of several layers of different materials. A group of these layers is described as constituting a superconducting coil portion which is formed of thin-film superconducting wires. The coils described by Miyazaki and those that are common in the art are constructed by arranging superconducting films, also called superconducting tapes, into the shape of wires and the wires are then further configured into the shape of coils. According to a review of the prior art, superconducting coils are formed by stacking superconducting films or layers so that electric current may flow in a desired direction and produce the appropriate magnetic field configuration. To the best knowledge and understanding of the inventors, the prior art doesn't teach any other method by which the superconducting films or tapes may be used to conduct a current.

Superconducting tapes themselves are also in short supply, as their demand is high. There is also the problem of the size and shape of the tapes which can only be constructed a few centimeters wide. In addition, the process that arranges the tapes into wires and further into coils is lengthy and error prone. The field of fusion reactor manufacturing requires a solution that is cheaper, faster, and more reliable.

Thus, there remains a need for a magnetic confinement device that can have different geometries, without requiring a too large number of parts, different coils and coils arrangements. There remains also a need for a simpler, faster and less error prone method for constructing a magnetic confinement device.

SUMMARY OF INVENTION

One embodiment addresses all or some of the drawbacks of known magnetic confinement devices and coils.

One embodiment provides a magnetic confinement device comprising a plurality of modules coupled to each other, wherein each module is adapted to conduct current in order to form a magnetic field and has:

- a first wall having a connecting surface adapted to engage a connecting surface of another module of the plurality of modules; and
- a groove separating the first wall into at least two different electrically conducting regions.

In one embodiment, the groove of at least one of the plurality of modules is adapted to be connected to a groove of another module of the plurality of modules to form a continuous groove.

In one embodiment, the groove is adapted to guide a flow of current into a certain direction, or into different paths, through the module.

In one embodiment, at least a module of the plurality of modules is mechanically and/or electrically coupled to another module of the plurality of modules, the connecting surface of the module comprising a mechanical and/or electrical connector adapted to be coupled to a mechanical and/or electrical connector of the other module.

In one embodiment, the coupled modules comprise each an electrical connector, the electrical connectors being positioned in order to accommodate a flow of current between said coupled modules.

In one embodiment, the at least one module and the other module comprise each an electrical connector, the electrical connectors being positioned in order to accommodate a flow of current between said modules.

In one embodiment, at least a module of the plurality of modules comprises at least a channel crossing through the first wall of said module, for example to enable a cooling fluid, like nitrogen or helium, to flow through said module.

In one particular embodiment, each channel is adapted to form a single channel with a channel of another module of the plurality of modules.

In one embodiment, at least a module of the plurality of modules comprises a second wall assembled to the first wall, the groove of said module being positioned between the first wall and the second wall.

In one embodiment, the plurality of modules comprises first modules having a first shape, and second modules having a second shape, wherein the modules are mechanically coupled to each other, and the first modules are electrically coupled to each other and/or the second modules are electrically coupled to each other.

In one particular embodiment, the first and second modules are electrically coupled to each other.

In one embodiment, the direction and/or the intensity of the current flowing through the first modules and/or the second modules determines the shape of the magnetic field in the magnetic confinement device.

In one embodiment, the modules are arranged in a shape of a torus.

In one embodiment, the modules are constructed to exhibit superconducting characteristics.

In one embodiment, at least a module of the plurality of modules is constructed as a stacking of different materials, comprising at least a superconducting layer comprising a superconducting material, like yttrium barium copper oxide or rare-earth barium copper oxide, wherein the groove of said module is patterned at least in the superconducting layer.

In one embodiment, the stacking comprises:

- a structural layer, for example composed or covered by a material like Hastelloy;
- a plurality of buffer layers on the structural layer;
- the superconducting layer on the plurality of buffer layers;

wherein the groove is patterned in the buffer layers and the superconducting layer.

In one embodiment, the stacking comprises:

- a structural layer, for example composed or covered by a material like Hastelloy;
- a plurality of buffer layers on the structural layer;
- the superconducting layer on the plurality of buffer layers; and
- a shunt layer on the superconducting layer and in the groove, the shunt layer being made of a metal, for example silver;

wherein the groove is patterned in the buffer layers and the superconducting layer.

In one embodiment, the stacking comprises a repeater layer under the shunt layer, the repeater layer being made of the repetition of the buffer and superconducting layers, and preferably several repetitions, for example between 4 and 80 repetitions, the groove being patterned in the buffer layers, the superconducting layer and the repeater layer.

In one embodiment, the stacking comprises another superconducting layer, for example a non-perforated and non-grooved layer, on the shunt layer, the other superconducting layer comprising a superconducting material like yttrium barium copper oxide or rare-earth barium copper oxide.

In one embodiment, each channel of the at least one module goes through the structural layer.

One embodiment provides a module adapted to the magnetic confinement device according to an embodiment.

One embodiment provides a module which is one of the plurality of modules coupled to each other included in the magnetic confinement device according to an embodiment.

ADVANTAGES

Advantages of an embodiment of the modular magnetic confinement device may be listed as: simpler and less error prone construction of different modules allowing for faster assembly; high confinement of the magnetic field, due to Meissner effect layers; servicing of each module is easier and replacement faster, accounting for cheaper device and a reduction of overall costs; coils may be easily changed and replaced, allowing not only for maintenance of the device but also for testing. Other technical advantages will become apparent to someone skilled in the art from the detailed description, figures, and claims. Moreover, while specific advantages have been enumerated above, different embodiments may include all, none or some of the advantages listed.

BRIEF DESCRIPTION OF DRAWINGS

The foregoing features and advantages, as well as others, will be described in detail in the following description of specific embodiments given by way of illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

When reference is made to a magnetic confinement, it refers to the confinement of the magnetic field.

The figures are not to scale. It should be noted that the drawings refer to an embodiment of the disclosed modular magnetic confinement device, sometimes also referred simply as device, when no ambiguity is anticipated. Other embodiments may be possible, as someone with appropriate training may readily appreciate. The actual dimension and/or shape of each of the components of the embodiment may vary. Only important details of the embodiment are shown, however one of ordinary skill in the art can appreciate how the overall device may be constructed, without undue experimentation. Some details have been omitted from the drawings, but the inventors believe that adding these details is unnecessary for the overall appreciation of the characteristics of the invention disclosed. These omitted details include, among others, elements for holding or fixing the device or its functional components. Some characteristics of the embodiment appear exaggerated to facilitate understanding. The embodiments disclosed, and alternatives observed should not be considered as limiting the invention in any way.

The magnetic confinement device is constructed from modules. The modules are coupled, preferably connected, to each other and are able to conduct electricity. The conduction of electricity in the module and the materials used for this end may require that the module operates at certain temperatures, thus the modules may require cooling.

Figure 1:
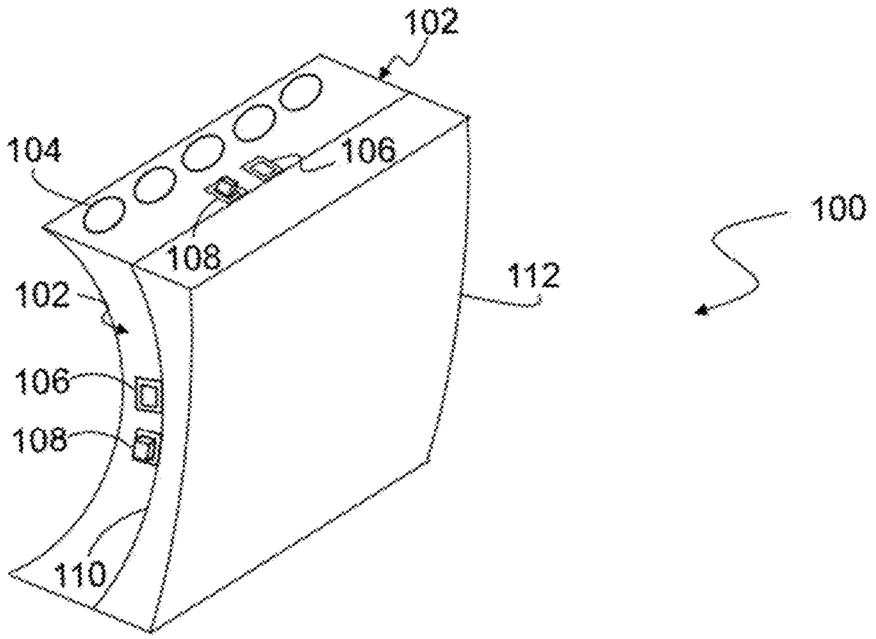
FIG. 1 is a general perspective view of an embodiment of the disclosed modular magnetic confinement device.

An embodiment of a module 100 of the modular magnetic confinement device is shown in FIG. 1. The module conducts electricity, so that it may form an electromagnetic field. The module has an outer wall 112 and an inner wall 110. The inner wall 110 has at least a connecting surface 102, two connecting surfaces in the shown embodiment. A least one tube, canal or channel, or, as in the illustrated module, several tubes, canals, or channels 104 may cross through the inner wall 110. The connecting surfaces of the inner wall 110 have electrical connectors 106 and/or mechanical connectors 108.

When reference is made to a channel, this also includes a tube, a tunnel or a canal.

The inner wall may be called the "first wall", and the outer wall may be called the "second wall".

The outer wall 112 may be electrically conducting, as it may represent a shunt layer, or electrically isolating, or a poor conductor.

Figure 2:
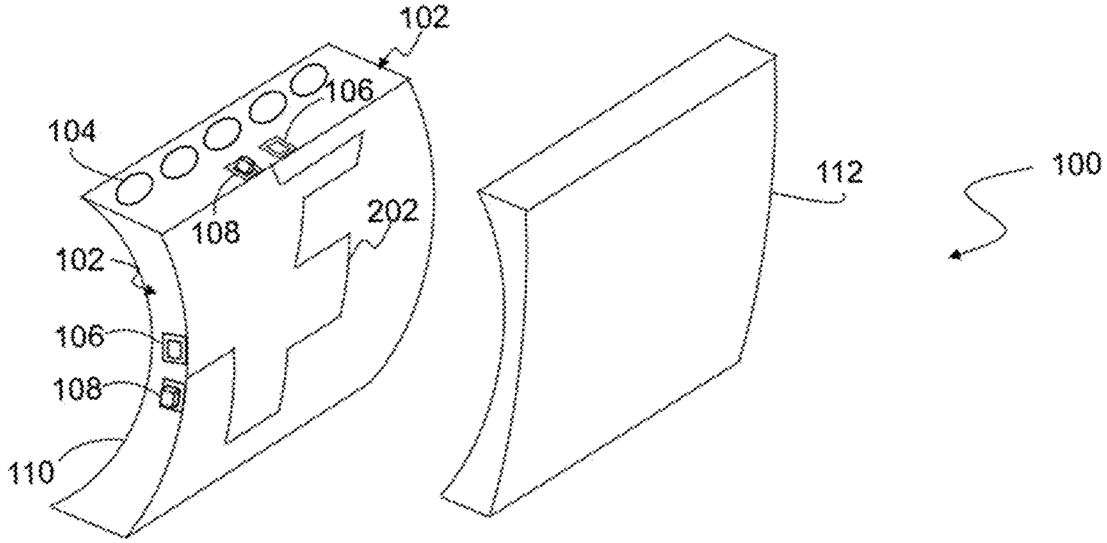
FIG. 2 is an exploded perspective view of an to embodiment of the disclosed modular magnetic confinement device.

An expanded view of the module 100 is shown in FIG. 2. In this expanded view, the outer wall 112, has been separated from the inner wall 110. The inner wall 110 has a ridge, wedge or groove 202. The groove 202 separates the inner wall 110 in at least two electrically conductive regions, so that current may flow in a certain direction, or different paths, according to the needs of the specific use. The electrical connectors 106 are positioned to accommodate the flow of current to other modules.

When reference is made to a groove, this also includes a ridge or a wedge.

According to an embodiment, a mechanical connector can also function as an electrical connector. Similarly, an electrical connector can also function as a mechanical connector. A connecting surface may comprise one connector allowing for both mechanical and electrical connection. Preferably, there is an electrical connector connecting each conductive region from either side of the groove.

Figure 3A:
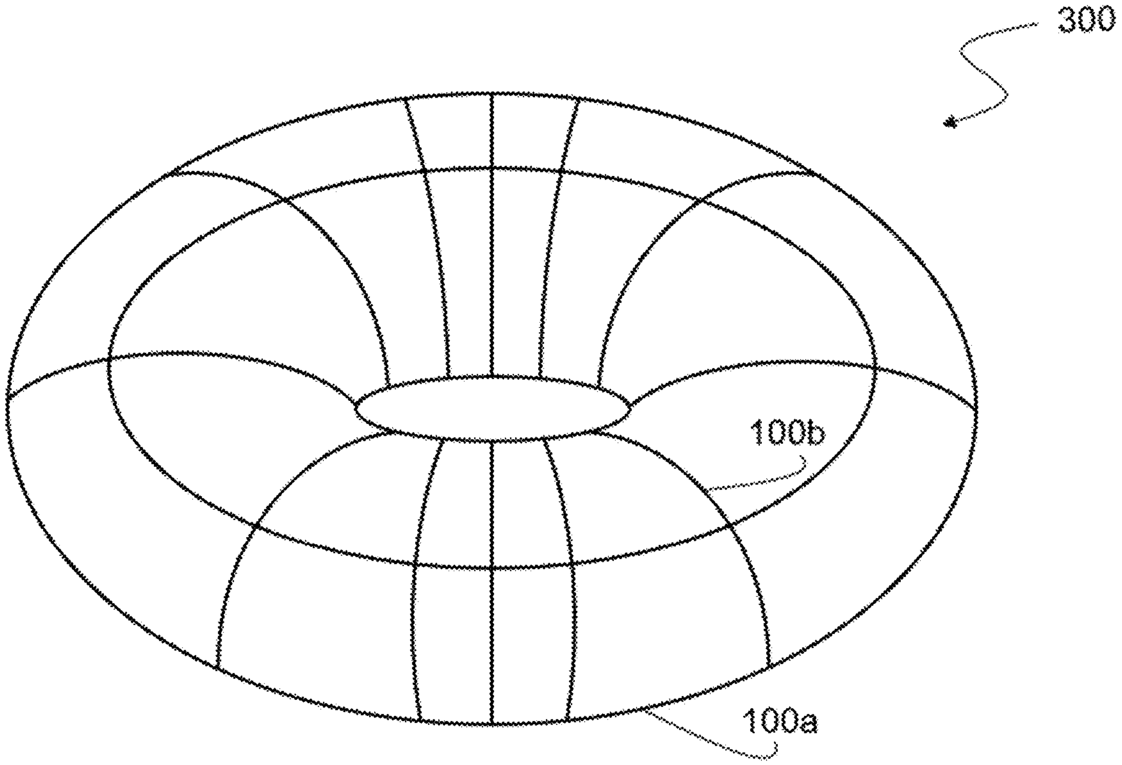
FIG. 3A is a perspective view of a toroidal device constructed out of modules as described by the disclosed modular magnetic confinement device.
Figure 3B:
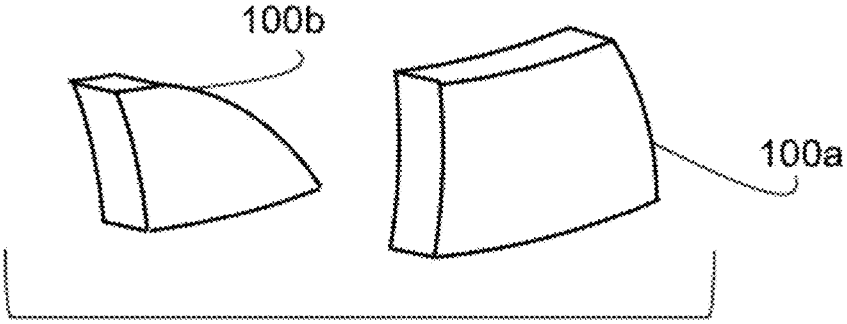
FIG. 3B is an expanded perspective view of two modules that comprise the toroidal device of FIG. 3A.
Figure 3C:
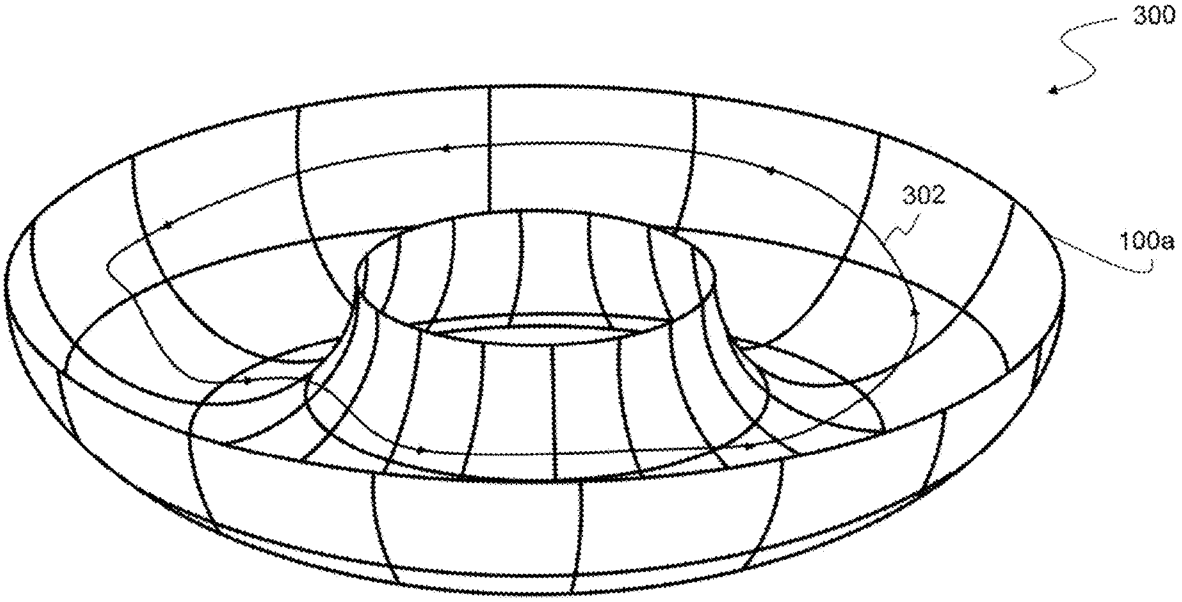
FIG. 3C is a perspective view of the interior of the toroidal device of FIG. 3A.

The modules are assembled into a device that is adapted to confine a magnetic field. They are assembled together with the mechanical connectors 108. In an embodiment, the device may be described as a torus 300, as shown in FIG. 3A. In order to construct the torus 300 out of the modules, different module shapes may be used. As shown in FIG. 3B, an upper module 100*b* is separate from a lower module 100*a*. Electrically, the modules may be coupled, preferably connected, together by using the electrical connectors 106. When these modules are coupled together, electrical current may flow from one to the other, resulting in the formation of a magnetic field 302 around the modules, as shown in FIG. 3C. Any number of modules may connect to each other and virtually, the magnetic confinement device may be of any shape.

A lower module may be called a "first module" and an upper module may be called a "second module".

EXAMPLE OF OPERATION

FIG. 3C shows an interior view of the torus 300 during operation. The lower modules 100*a* are electrically interconnected. They may also be interconnected with other modules, like the upper modules 100*b* in FIG. 3B. Electricity is flowing through the modules and this results in the formation of a magnetic field 302 inside the torus 300. The shape of the magnetic field 302 may be configured by changing the direction and intensity of the current flowing through the lower modules 100*a* or the upper modules 100*b*.

In order for the magnetic field 302 to be confined to the interior of the magnetic confinement device, be it in the torus 300 configuration or other, the construction of the modules may make at least partially use of the Meisner effect. The Meisner effect is the phenomenon by which magnetic fields may not exist inside perfect conductors, or superconductors. The Meisner effect is observed in superconducting materials. For certain materials, to exhibit superconducting properties, it is necessary that they operate inside certain temperature limits. In order to ensure that the module operates inside this temperature range, cooling fluid may be made to flow through the channels 104.

EXAMPLE OF MODULE CONSTRUCTION

Figure 4:
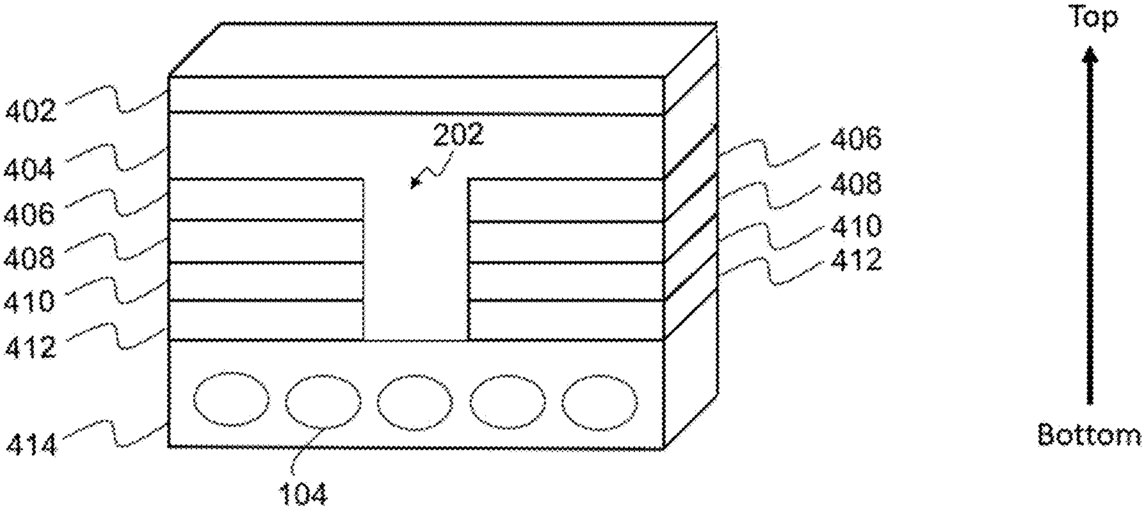
FIG. 4 is a perspective view of the interior of the wall of a module of the disclosed modular magnetic confinement device.

An embodiment of the inner structure of the modules is shown in FIG. 4. A module may be constructed as a stacking of several layers. From the bottom, which may be closest to the side the magnetic field will be formed on, the stacking comprises a first structural layer 414, which may be composed or covered by a material like Hastelloy. The channels 104 for the cooling fluid may go through the first structural layer 414. Several buffer layers are deposited on top of the first structural layer 414. Sputtered on top of the first structural layer 414 is a layer of a material like alumina, called the first buffer layer 412. The second buffer layer 410 is sputtered on top of the first buffer layer 412. The second buffer layer 410 is composed of a material like yttria. The third buffer layer 408 is composed of a material like magnesium oxide and may be deposited by metal-organic chemical vapor deposition (MOCVD) or ion beam assisted deposition (IBAD). A superconducting layer 406 is deposited on top of the third buffer layer 408. The superconducting layer 406 may be deposited by MOCVD and may be composed of a material like REBCO or YBCO or other appropriate superconducting materials. Material from the first buffer layer 412, the second buffer layer 410, the third buffer layer 408 and the superconducting layer 406 may be removed in order to create a pattern which describes the groove 202 in the inner wall 110 of the module as shown in FIG. 2. In order to remove the material, a technique like laser patterning may be used. Other techniques, like a mechanical technique or photolithography may be used to remove the material.

Alternatively, it is possible to remove material only from the superconducting layer 406 to create the groove 202.

The buffer layers may form an appropriate template for the formation of the superconducting layer. There may be only one buffer layer instead of a plurality of buffer layers.

Other appropriate materials may be used in place of the ones described here.

The groove 202 may be filled with a metal, which may be silver, forming a shunt layer 404 that may also cover the superconducting layer 406. Such a shunt layer offers a path in case of quenching of the superconducting layer 406. The shunt layer 404 is optional. There are other solutions to address the quenching problem, such as operating at low enough current, temperature and/or magnetic field. Quenching is a problem for superconductivity in general, which is not linked to the problem addressed by the embodiments.

Before forming the groove, the described sequence of buffer and superconducting layers may be repeated several times (forming a repeater layer), with best results being achieved between 4 and 80 of the layer sequence, for example between 20 and 40 repetitions of the layer sequence for magnetic fields of about 10 Tesla. The groove may also be formed in the repeater layer.

For example, the depth of the groove 202 is comprised between 3 and 5 μm for one sequence of buffer and superconducting layers. If the sequence is repeated, the depth of the groove may be multiplied by the number of sequences. For example, the depth of the groove is comprised between 3×N and 5×N μm, where N is the number of sequences.

The repeated layer sequence may comprise a silver layer on the superconducting layer 406, or another material which is appropriate for the formation of another sequence of buffer and superconducting layers on said stacking.

To make at least partially use of the Meisner effect or similar effect in which the superconductor partly or fully expels magnetic field, on top of all the other layers, a single, preferably non-perforated (and not-grooved), layer of superconducting material should be placed. This layer is the Meisner effect layer 402 and is composed of a superconducting material like YBCO or REBCO.

Layers of other materials either above or below the ones described may be required for the proper operation of the device, nevertheless it should be apparent to anyone with ordinary skill in the art how to achieve the functionality described here with a different layer configuration. As an example of this, stabilizing layers composed of silver, copper and other metals may be placed below the first structural layer 414.

The inner wall 110 may include layers 414, 412, 410, 408, 406, 404 and the groove 202 of FIG. 4, and the outer wall 112 may include layer 402 of FIG. 4.

According to an embodiment, the module is a modular coil.

Other layer configurations and/or methods for constructing or manufacturing a module, for example a modular coil, should be apparent to anyone with ordinary skill in the art. Another example of a method for manufacturing superconducting coils, which can be modular coils, and an example of device is given in European patent application number EP22305437, filed on Apr. 4, 2022 by the same applicant "RENAISSANCE FUSION", entitled "METHOD FOR MANUFACTURING SUPERCONDUCTING COILS AND DEVICE", which is hereby incorporated by reference to the maximum extent allowable by law.

Example embodiments of the invention are summarized here. Other embodiments can also be understood from the entirety of the specification as well as the claims filed herein.

Example 1. A magnetic confinement device (300) comprising a plurality of modules coupled to each other, wherein each module (100; 100*a*, 100*b*) is adapted to conduct current in order to form a magnetic field and has:

- a first wall (110) having a connecting surface (102) adapted to engage a connecting surface of another module of the plurality of modules; and
- a groove (202) separating the first wall (110) into at least two different electrically conducting regions.

Example 2. The magnetic confinement device according to example 1, wherein the groove of at least one of the plurality of modules is adapted to be connected to a groove of another module of the plurality of modules to form a continuous groove.

Example 3. The magnetic confinement device according to example 1 or 2, wherein the groove (202) is adapted to guide a flow of current into a certain direction, or into different paths, through the module.

Example 4. The magnetic confinement device according to any one of examples 1 to 3, wherein at least a module (100) of the plurality s is mechanically and/or electrically coupled to another module of the plurality of modules, the connecting surface of the module comprising a mechanical (108) and/or electrical connector (106) adapted to be coupled to a mechanical and/or electrical connector of the other module.

Example 5. The magnetic confinement device according to example 4, wherein the coupled modules comprise each an electrical connector, the electrical connectors being positioned in order to accommodate a flow of current between said coupled modules.

Example 6. The magnetic confinement device according to any one of examples 1 to 5, wherein at least a module (100) of the plurality of modules comprises at least a channel (104) crossing through the first wall (110) of said module, for example to enable a cooling fluid, like nitrogen or helium, to flow through said module.

Example 7. The magnetic confinement device according to example 6, wherein each channel is adapted to form a single channel with a channel of another module of the plurality of modules.

Example 8. The magnetic confinement device according to any one of examples 1 to 7, wherein the first wall (110) of at least a module (100) of the plurality of modules comprises at least two connecting surfaces (102), each adapted to engage a connecting surface of another module of the plurality of modules.

Example 9. The magnetic confinement device according to any one of examples 1 to 8, wherein at least a module (100) of the plurality of modules comprises a second wall (112) assembled to the first wall (110), the groove (202) of said module being positioned between the first wall and the second wall.

Example 10. The magnetic confinement device according to any one of examples 1 to 9, wherein at least two modules (100*a*, 100*b*) of the plurality of modules have different shapes.

Example 11. The magnetic confinement device according to any one of examples 1 to 10, wherein the plurality of modules comprises first modules (100*a*) having a first shape, and second modules (100*b*) having a second shape, wherein the modules are mechanically coupled to each other, and the first modules are electrically coupled to each other and/or the second modules are electrically coupled to each other.

Example 12. The magnetic confinement device according to example 11, wherein the first and second modules are electrically coupled to each other.

Example 13. The magnetic confinement device according to example 11 or 12, wherein the direction and/or the intensity of the current flowing through the first modules (100*a*) and/or the second modules (100*b*) determines the shape of the magnetic field (302) in the magnetic confinement device.

Example 14. The magnetic confinement device according to any one of examples 1 to 13, wherein the modules are arranged in a shape of a torus.

Example 15. The magnetic confinement device according to any one of examples 1 to 14, wherein the modules are constructed to exhibit superconducting characteristics.

Example 16. The magnetic confinement device according to any one of examples 1 to 15, wherein at least a module of the plurality of modules is constructed as a stacking of different materials, comprising at least a superconducting layer (406) comprising a superconducting material, like yttrium barium copper oxide or rare-earth barium copper oxide, wherein the groove (202) of said module is patterned at least in the superconducting layer.

Example 17. The magnetic confinement device according to example 16, wherein the stacking comprises:

- a structural layer (414), for example composed or covered by a material like Hastelloy;
- a plurality of buffer layers on the structural layer;
- the superconducting layer (406) on the plurality of buffer layers; and
- a shunt layer (404) on the superconducting layer and in the groove, the shunt layer being made of a metal, for example silver;

wherein the groove is patterned in the buffer layers and the superconducting layer.

Example 18. The magnetic confinement device according to example 17, wherein the plurality of buffer layers comprises:

- a first buffer layer (412) on the structural layer, for example a layer of a material like alumina;
- a second buffer layer (410) on the first buffer layer, for example a layer of a material like yttria;
- a third buffer layer (408) on the second buffer layer, for example a layer of a material like magnesium oxide.

Example 19. The magnetic confinement device according to example 17 or 18, wherein the stacking comprises a repeater layer under the shunt layer (404), the repeater layer being made of the repetition of the buffer and superconducting layers, and preferably several repetitions, for example between 4 and 80 repetitions, the groove being patterned in the buffer layers, the superconducting layer and the repeater layer.

Example 20. The magnetic confinement device according to any one of examples 17 to 19, wherein the stacking comprises another superconducting layer (402), for example a non-perforated and non-grooved layer, on the shunt layer (404), comprising a superconducting material like yttrium barium copper oxide or rare-earth barium copper oxide.

Example 21. The magnetic confinement device according to any one of examples 17 to 20 in combination with example 6 or 7, wherein each channel (104) of the at least one module goes through the structural layer (414).

Example 22. A module (100) adapted to the magnetic confinement device according to any one of examples 1 to 21.

Example 23. A method for fabricating a module (100) according to example 22, the method comprising:

- providing a structural layer (414);
- forming a plurality of buffer layers on the structural layer;
- depositing, for example by metal-organic chemical vapor deposition, a superconducting layer (406) on the plurality of buffer layers; and
- removing material at least from the superconducting layer, for example using a laser patterning technique, to form a groove (202);
- depositing a layer of a metal on the superconducting layer, comprising filling the groove with said metal, for example silver, to form a shunt layer (404).

Example 24. The method according to example 23, further comprising:

- repeating the buffer and superconducting layers before forming the groove and forming the shunt layer (404), preferably several times, for example or between 4 and 80 repetitions.

Example 25. The method according to example 23 or 24, wherein forming the plurality of buffer layers comprises:

- sputtering a first buffer layer (412) on the structural layer, for example a layer of a material like alumina;
- sputtering a second buffer layer (410) on the first buffer layer, for example a layer of a material like yttria;
- depositing, for example by metal-organic chemical vapor deposition or ion beam assisted deposition, a third buffer layer (408) on the second buffer layer, for example a layer of a material like magnesium oxide.

Example 26. The method according to any of examples 23 to 25, further comprising:

- depositing another superconducting layer (402), for example a non-perforated and non-grooved layer, on the shunt layer (404), comprising a superconducting material like yttrium barium copper oxide or rare-earth barium copper oxide.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

LIST OF ACRONYMS

MOCVD Metal-organic chemical vapor deposition
IBAD Ion beam assisted deposition
REBCO Rare-earth barium copper oxide
YBCO Yttrium barium copper oxide

The invention claimed is:

1. A magnetic confinement device comprising a plurality of modules coupled to each other, wherein each module is adapted to conduct current in order to form a magnetic field and has:

- a first wall having a connecting surface adapted to engage a connecting surface of another module of the plurality of modules; and
- a groove separating the first wall into at least two different electrically conducting regions;

wherein at least a module of the plurality of modules:

- comprises a second wall assembled to the first wall of said module, the groove of said module being positioned between the first wall and the second wall; and
- is constructed as a stacking of different materials, comprising at least a superconducting layer comprising a superconducting material, wherein the groove of said module is patterned at least in the superconducting layer.

2. The magnetic confinement device according to claim 1, wherein the groove of at least a module of the plurality of modules is adapted to be connected to a groove of another module of the plurality of modules to form a continuous groove.

3. The magnetic confinement device according to claim 1, wherein the groove is adapted to guide a flow of current into a certain direction, or into different paths, through the module.

4. The magnetic confinement device according to claim 1, wherein at least a module of the plurality of modules is mechanically and/or electrically coupled to another module of the plurality of modules, the connecting surface of the at least one module comprising a mechanical and/or electrical connector adapted to be coupled to a mechanical and/or electrical connector of the other module.

5. The magnetic confinement device according to claim 4, wherein the at least one module and the other module comprise each an electrical connector, the electrical connectors being positioned in order to accommodate a flow of current between said modules.

6. The magnetic confinement device according to claim 1, wherein at least a module of the plurality of modules comprises a channel crossing through the first wall of said module, for example to enable a cooling fluid, like nitrogen or helium, to flow through said module.

7. The magnetic confinement device according to claim 6, wherein the channel is adapted to form a single channel with a channel of another module of the plurality of modules.

8. The magnetic confinement device according to claim 1, wherein the plurality of modules comprises first modules having a first shape, and second modules having a second shape, wherein the modules are mechanically coupled to each other, and:

the first modules are electrically coupled to each other; and/or the second modules are electrically coupled to each other.

9. The magnetic confinement device according to claim 8, wherein the first and second modules are electrically coupled to each other.

10. The magnetic confinement device according to claim 8, wherein the direction and/or the intensity of the current flowing through the first modules and/or the second modules determines the shape of the magnetic field in the magnetic confinement device.

11. The magnetic confinement device according to claim 1, wherein the modules are arranged in a shape of a torus.

12. The magnetic confinement device according to claim 1, wherein the modules are constructed to exhibit superconducting characteristics.

13. The magnetic confinement device according to claim 1, wherein the superconducting material is a yttrium barium copper oxide or a rare-earth barium copper oxide.

14. The magnetic confinement device according to claim 1, wherein the stacking comprises:

a structural layer, for example composed or covered by a material like Hastelloy;

a plurality of buffer layers on the structural layer;

the superconducting layer on the plurality of buffer layers;

wherein the groove is patterned in the buffer layers and the superconducting layer.

15. The magnetic confinement device according to claim 14, wherein the stacking further comprises:

a shunt layer on the superconducting layer and in the groove, the shunt layer being made of a metal, for example silver.

16. The magnetic confinement device according to claim 15, wherein the stacking comprises a repeater layer under the shunt layer, the repeater layer being made of the repetition of the buffer and superconducting layers, and preferably several repetitions, for example between 4 and 80 repetitions, the groove being patterned in the buffer layers, the superconducting layer and the repeater layer.

17. The magnetic confinement device according to claim 15, wherein the stacking comprises another superconducting layer, for example a non-perforated and non-grooved layer, on the shunt layer, the other superconducting layer comprising a superconducting material like yttrium barium copper oxide or rare-earth barium copper oxide.

18. The magnetic confinement device according to claim 14, wherein:

at least one module of the plurality of modules comprises a channel crossing through the first wall of said module, for example to enable a cooling fluid, like nitrogen or helium, to flow through said module; and the channel of the at least one module goes through the structural layer.

19. A module being one of the plurality of modules coupled to each other included in the magnetic confinement device according to claim 1.

* * * * *